UNITED STATES PATENT OFFICE.

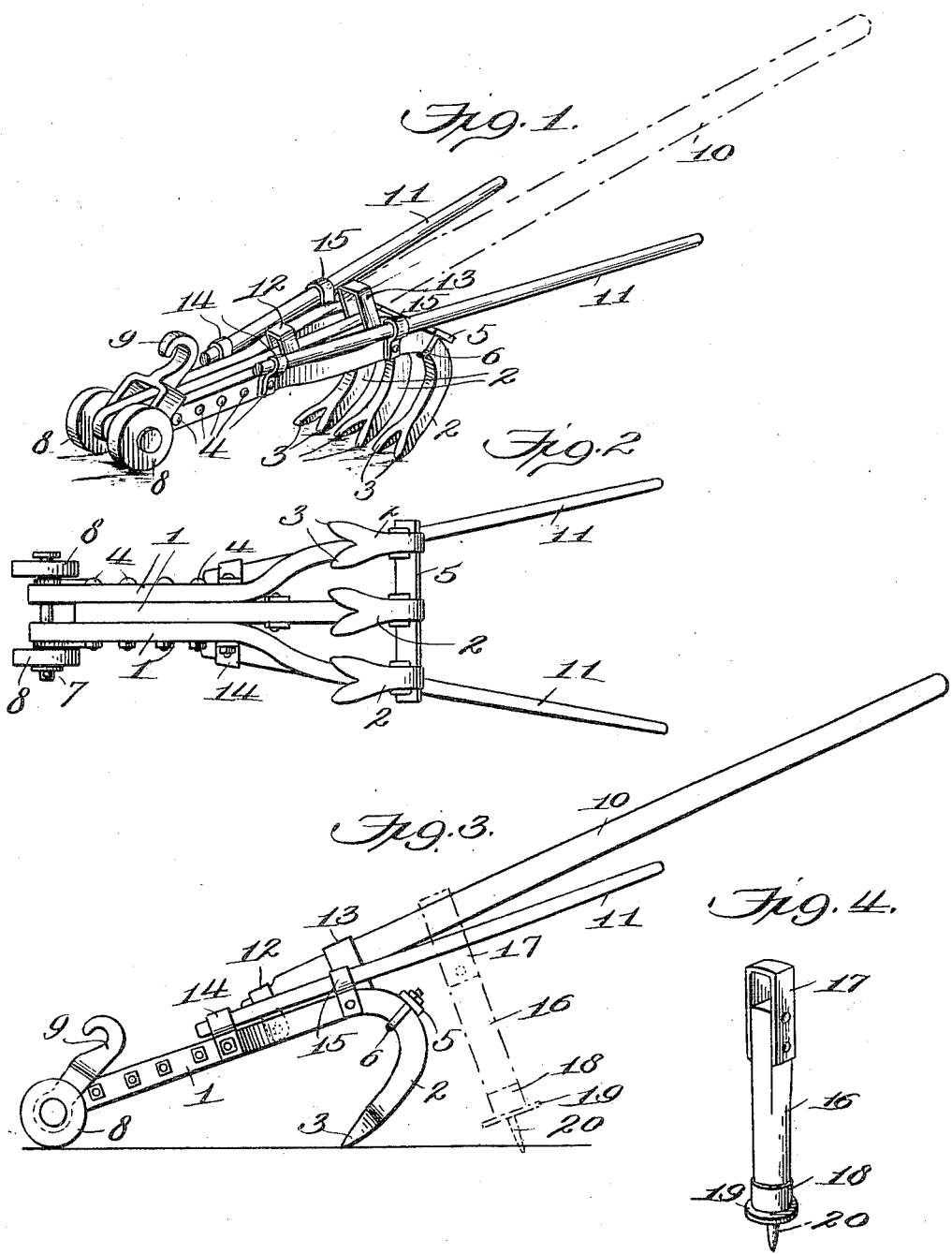

GEORGE T. McGEHEE, OF SAN MARCOS, TEXAS.

ROOT-PULLER.

971,459.

Specification of Letters Patent.   Patented Sept. 27, 1910.

Application filed April 30, 1910.   Serial No. 558,692.

*To all whom it may concern:*

Be it known that I, GEORGE T. McGEHEE, a citizen of the United States, residing at San Marcos, in the county of Hays and State of Texas, have invented new and useful Improvements in Root-Pullers, of which the following is a specification.

The present invention has reference to improvements in root pullers, and it comprehends generally the production of an implement of that type or nature designed especially for removing the stumps of so-called "grubs" of mesquite timber, the roots of which grow under the earth in bulbous form and attain in many instances a diameter of from one to two feet.

As a general rule, the mesquite shrub grows in groups or clumps, the individual members of which are located close together. Hence it has been found that the ordinary form of root puller is ineffectual for clearing ground wherein these groups or clumps are present, for the reason that it includes only a single grubber, and for the further reason that its teeth are so constructed as to preclude their being forced the requisite depth into the ground.

This invention aims primarily to provide an implement wherein the defects specified are overcome, and which, moreover, is so constructed as to admit of its ready engagement with either a single root or a group of roots at the proper point, of its disengagement with equal facility from the same, and, finally, of being easily shifted from one position to another and from place to place.

A practical embodiment of the invention is illustrated in the accompanying drawings, wherein—

Figure 1 is a perspective view of the improved root puller; Fig. 2 is a bottom plan view of the same; Fig. 3 is an enlarged side elevation; and Fig. 4 is a detail perspective view of the detachable fulcrum post shown in dotted lines in Fig. 3.

In said drawings, the implement is shown as comprising, as essential parts or elements, a grubbing device, a rolling support for the front end thereof, a handle or handles connected to said device, and a fulcrum post.

The grubbing device consists, preferably, of a plurality of grubbers 1, each of which is in the form of a metal beam provided at its rear end with a downwardly and forwardly curved hook or tooth 2, the free end of such hook being enlarged and forked, as shown, to provide a pair of points 3. In the construction illustrated, three of these beams are employed, their front portions being arranged side by side and removably connected by a series of transverse bolts 4. The central beam, in this instance, may terminate at its front end short of the corresponding ends of the two outer or end beams, which latter have their rear portions bent outwardly or away from said central beam, the three beams being connected together adjacent the upper ends of the hooks 2 by a transverse strap 5 fastened thereto by looped bolts 6 or the like. The projecting ends of the two outer beams are further connected by a removable axle pin 7 which passes through perforations in said beam ends and carries upon its own ends a pair of wide heavy rollers 8, said rollers and pin constituting the afore-mentioned roller support. To this support there is pivoted the cable hook 9, the legs of which straddle the beam ends and are mounted on pin 7.

With the beams there is associated a handle device which is adapted to be engaged by the operator. This device may consist either of a single beam 10 of considerable length, or of a pair of comparatively short beams or handles 11. The first-mentioned beam is designed for detachable connection to the central grubber, which latter is provided with a pair of loops 12 and 13, spaced apart from each other, the arrangement being such that said beam may rest upon the upper surface of the grubber referred to, with its forward end inserted through said loops. The short handles are connected in a similar manner to the diverging portions of the two outer grubbers by pairs of loops 14 and 15, the rear loops 15 being disposed in substantial alinement with the rear loop 13 of the main handle or beam 10. The two short handles are preferably in the form of round bars, while the forward portion of the main beam is rectangular in cross-section, such construction preventing it from turning in its sockets, *i. e.*, the loops 12 and 13.

There is finally associated with the main handle the fulcrum post 16, which is adapted for detachable connection to said handle, this being effected through the medium of a looped strap 17 secured to the upper end of the post. At its lower end, said post carries a metal cap 18 provided with an outstanding circumferential bottom flange 19, and with a central depending spike 20.

The function and operation of the various elements may be stated as follows: When the implement is drawn to the proper spot, which may be effected in any suitable manner, the operator, standing between the two handles, bears down upon them, thus driving the hooks the requisite depth in the ground to engage the root or roots from beneath. The same result may also be obtained by means of the main handle, if the latter be employed either in place of or in addition to the short handles. Power is then applied to the cable (not shown) connected with hook 9, whereupon the hooks will, as the pull continues, eventually remove the root or roots. During the initial application of power, the rollers 8 will prevent the front ends of the grubbers from digging into the ground, and will also preclude tipping or sidewise movement of the implement by reason of their wide bearing surfaces. Should it be found advisable to change the position of the implement to any extent, this may be effected by the application of upward pressure upon the handle device, and the implement turned upon the roller support as a fulcrum. If, however, the main handle and the fulcrum post 16 be employed, downward pressure upon the free end of said handle will have the effect of driving said post into the ground until the cap flange 19 contacts with the surface thereof; the post will then constitute the fulcrum for the implement, and, upon the continuation of the pressure, the front end of the latter will be raised, and the implement then turned. If the pressure applied be sufficiently great, the hooks will be drawn out of the ground, together with the stump or roots. It will be seen, therefore, that the main handle serves, in this instance, as a lever, both for shifting the position of the implement and for withdrawing the hooks with or without the work to be removed, the relatively great length of the long arm of the lever facilitating its operation. Also, it will be observed that both forms of the handle device are capable of ready attachment to and detachment from the grubbing device, the character of the particular piece of work determining under ordinary circumstances the form to be used.

So far as the grubbing device is concerned, it may be stated that while the number of grubbers composing the same is arbitrary, the preferred number is as shown. At the same time, it has been found that one grubber alone may be sufficient to perform the work under certain conditions, and in such case the two outer grubbers may be removed. In like manner, the central grubber may be detached, and the outer grubbers alone employed, they being coupled directly together. Illustration of the foregoing is omitted, since it entails no further change in the implement. Under most circumstances, however, it is advisable, if not strictly essential, that two or more grubbers be used, owing to the close growth of the shrubs, which in many instances, is such as to preclude individual removal of the roots.

I claim as my invention:

In a root pulling implement, the combinaation of a plurality of connected grubbers arranged side by side; a single beam connected to one of said grubbers; a fulcrum post carried by said beam rearwardly of said grubbers and provided at its upper end with a strap detachably connected to said beam, and at its lower end with a spiked cap; a roller support comprising an axle passed through the front end of the grubbers, and a pair of rollers mounted on said axle; and a hook pivoted to said axle.

In testimony whereof I have hereunto set my hand in presence of two subscribing witnesses.

GEORGE T. McGEHEE.

Witnesses:
L. B. JONES,
T. P. OLIVER.